United States Patent [19]
Drader

[11] Patent Number: 4,711,746
[45] Date of Patent: Dec. 8, 1987

[54] PROCESS FOR WELDING THERMOPLASTIC BY INJECTION

[76] Inventor: Clarence H. Drader, 52073 Highway 21, Sherwood Park, Alberta, Canada, T8B 1J4

[21] Appl. No.: 791,148

[22] Filed: Oct. 24, 1985

Related U.S. Application Data

[63] Continuation-in-part of Ser. No. 669,075, Nov. 7, 1984, abandoned.

[51] Int. Cl.$^4$ .................... B29C 35/02; B29C 45/14; B29C 65/02; B32B 35/00
[52] U.S. Cl. ................................ 264/36; 156/244.11; 156/499; 219/421; 222/146.5; 264/261; 264/266
[58] Field of Search ................ 264/36, 261, 263, 266; 156/244.11, 497, 499, 500, 578, 579; 222/146.5, 146.1; 219/230, 421; 126/344; 228/52, 53

[56] References Cited

U.S. PATENT DOCUMENTS

| | | | |
|---|---|---|---|
| 2,372,737 | 4/1945 | Philips | 156/497 |
| 2,862,543 | 12/1955 | Kaminsky | 156/497 |
| 3,713,947 | 1/1973 | Hawkins | 156/579 |
| 4,090,643 | 5/1978 | Wilkinson et al. | 222/146.5 |
| 4,199,082 | 4/1980 | Ornsteen | 222/146.5 |
| 4,289,257 | 9/1981 | Herb et al. | 222/146.5 |
| 4,378,076 | 3/1983 | Stirnweiss | 222/146.5 |
| 4,601,597 | 7/1986 | Bertram et al. | 222/146.1 |

Primary Examiner—Jan H. Silbaugh
Assistant Examiner—Karen D. Kutach
Attorney, Agent, or Firm—Ernest Peter Johnson

[57] ABSTRACT

A device is provided for forming a plastic weld, to repair a crack in a plastic article or join two plastic parts. The device comprises a barrel having an internal chamber. A nozzle is part of the barrel and forms a restrictive orifice outlet. Plastic filler rod can be forced by drive rolls into the chamber through an inlet. A heater coil is provided to heat the barrel. In use, the drive rolls are actuated to fill the chamber with filler plastic and generate a high pressure (e.g. 2500 psi). Concurrently, the heater coil heats the plastic in the chamber to a molten state. The molten plastic is forcefully ejected through the orifice outlet. To effect the weld, the hot tip of the nozzle is buried in the workpiece and drawn along the crack; it plasticizes the weld area plastic as it moves along. At the same time, the molten filler plastic is jetted into the molten weld area plastic and forcefully intermixed therewith to generate a competent bead.

2 Claims, 6 Drawing Figures

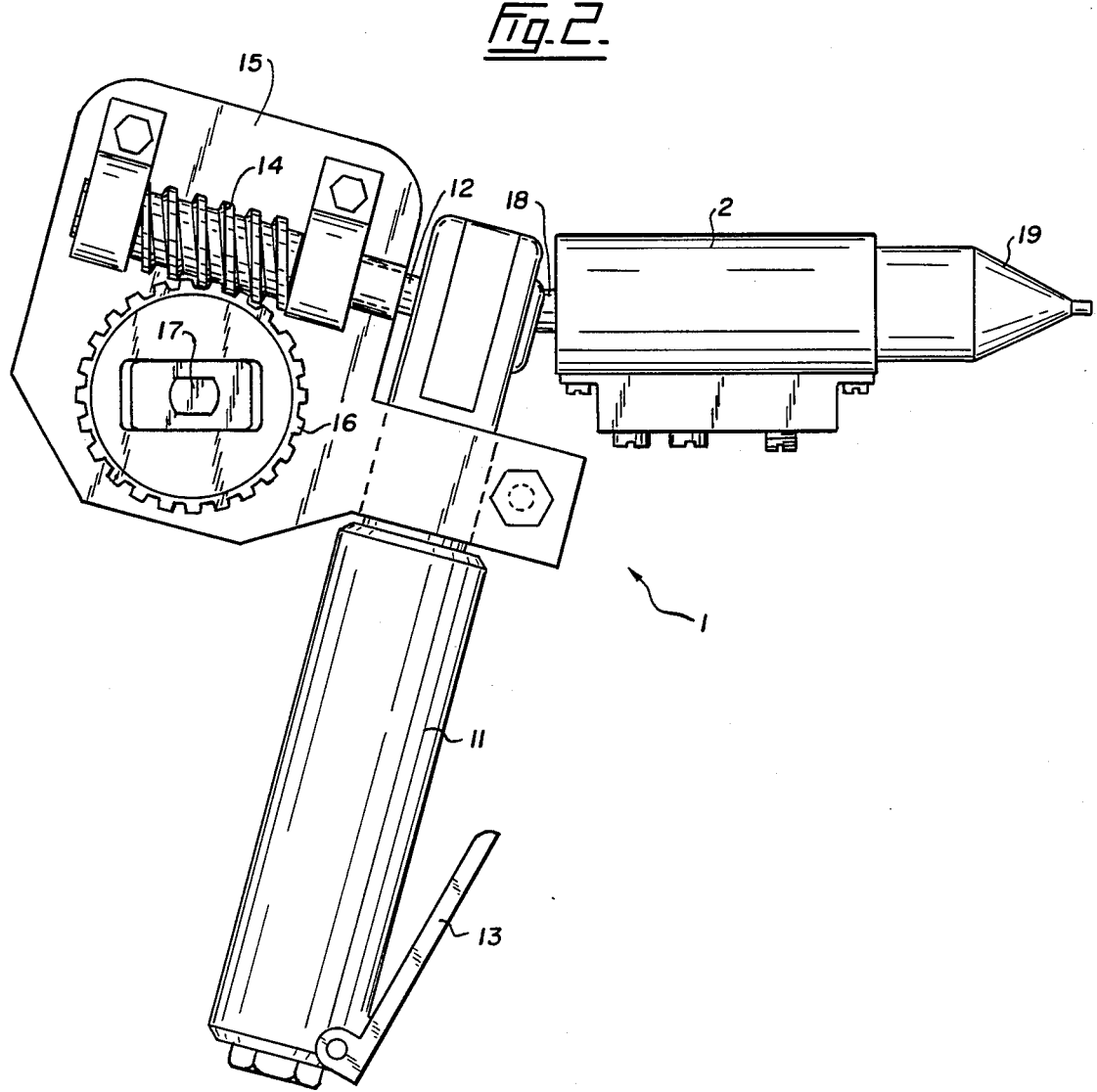

PROCESS FOR WELDING THERMOPLASTIC BY INJECTION

CROSS-REFERENCE TO RELATED APPLICATION

This application is a continuation-in-part of application Ser. No. 669,075 filed Nov. 7, 1984, now abandoned.

BACKGROUND OF THE INVENTION

1. Field of the Invention

This invention relates to a process and apparatus useful for welding thermoplastic material.

2. Description of the Prior Art

Plastic welding is commonly used to weld together the walls of a crack in a plastic article or to form a connecting weld along a junction line to join two plastic parts. (The word "workpiece" used hereafter is to be understood to encompass the article to be repaired and the parts to be joined.)

Heretofore, the procedure commonly used has involved the following:

usually forming a V-shaped joint or channel along the crack or junction line, to provide space for the filler material and to remove surface oxides;

buffing or rubbing with sandpaper the surfaces of the workpiece weld area and the filler rod, to remove surface oxides;

pre-heating the weld area (i.e. the sloped surfaces of the channel) to welding temperature (450°-800° F.) using a hot gas jet;

and immediately thereafter laying a rod or strip of filler plastic into the heated channel and at the same time applying a jet of hot gas to heat the portion of filler material being laid in, to the welding temperature, with the result that the filler material fuses with the workpiece material to form the weld.

Prior art United States patents which are exemplary of this technique are U.S. Pat. Nos. 2,722,964 (Duncan), 3,853,669 (Westlein), 3,047,050 (Sourber), and 2,862,543 (Kaminsky).

In applicant's view, there are a number of problems associated with this prior art technique. More particularly:

(1) There is a high incidence of defective welds produced. In some cases, the weld does not hold at all, in other cases it is too weak to provide acceptable performance in use;

(2) The process is slow and labor-intensive, thereby making it costly. For example, the requirements:

that the crack or junction line be "V'ed" out before welding;

that pass after pass of small diameter filler rod be laid into the V channel, to fill it from the apex up; and that the filler rod and workpiece weld area be cleaned by buffing before welding;

all result in labour consumption with accompanying cost; and (3) The use of hot gas to effect softening of the filler and workpiece materials is inefficient. It is difficult to localize the hot gas sufficiently, so that only that portion of the workpiece that requires softening is softened. It has been calculated that the provision of hot gas consumes about ⅓ of the total expenditure used to make the weld.

There has therefore long existed a need to provide a welding process that addresses these shortcomings and is improved with respect to them. The present invention is directed to satisfying this need.

SUMMARY OF THE INVENTION

In accordance with the invention, molten pressurized filler plastic is provided in the chamber of a dispensing device (referred to hereinafter as a "gun"). This filler plastic is ejected through a restrictive orifice in the heated nozzle of the gun, to produce a jet or stream that injects with force into the heated plastic of the weld area of the workpiece. In conjunction with the filler plastic injection, the tip of the nozzle is heated, pressed into the workpiece plastic, and drawn along the crack or junction line, to thereby heat the workpiece weld area plastic to welding temperature to render it molten and to submerge the orifice in said molten plastic. As the tip is drawn along the crack or line it ploughs a furrow therealong through the workpiece. Oxidized plastic is displaced upwardly out of the furrow, leaving the furrow having a relatively clean, molten plastic surface layer, into which molten layer the jet is injected. The molten filler material fuses with the molten workpiece material and fills the furrow, to produce a competent weld.

The invention is characterized by the following advantages:

forcefully delivering the molten filler material through a submerged orifice into the molten workpiece material produces a forced intermingling that yields a strong weld;

the hot tip ploughs through a layer of the oxidized plastic material along each of the edges of the crack or junction line and disperses at least some of it away from the weld area, thereby improving the possibility of obtaining a strong weld;

by using a heated tip instead of hot gas to supply heat to the workpiece plastic in the weld area, localization and efficiency of heating is improved and the cost of the weld is significantly reduced;

because molten filler material is supplied to the weld area, it is capable of distributing itself in the channel - by using a thicker filler rod, it is thus possible to completely fill the channel in one or two passes and thereby shorten the time to produce the weld.

In another aspect of the invention there is provided a novel dispensing device or gun for welding plastic. This gun comprises the combination of:

a barrel having an outlet nozzle, said barrel forming a chamber, said nozzle forming a restrictive orifice for the ejection of molten filler plastic from the chamber;

means for heating the barrel and nozzle, whereby plastic in the chamber may be indirectly heated to a molten condition and the tip of the nozzle may be maintained at a high temperature so that it will heat the workpiece plastic in the weld area to a molten condition, when drawn through said weld area; and means for forcing filler plastic rod axially into the chamber at a point spaced from the nozzle, to assist in maintaining a high pressure at the orifice outlet.

DESCRIPTION OF THE DRAWINGS

FIG. 2 is a side view of the other side of the gun;

DESCRIPTION OF THE PREFERRED EMBODIMENT

Figure 1A:
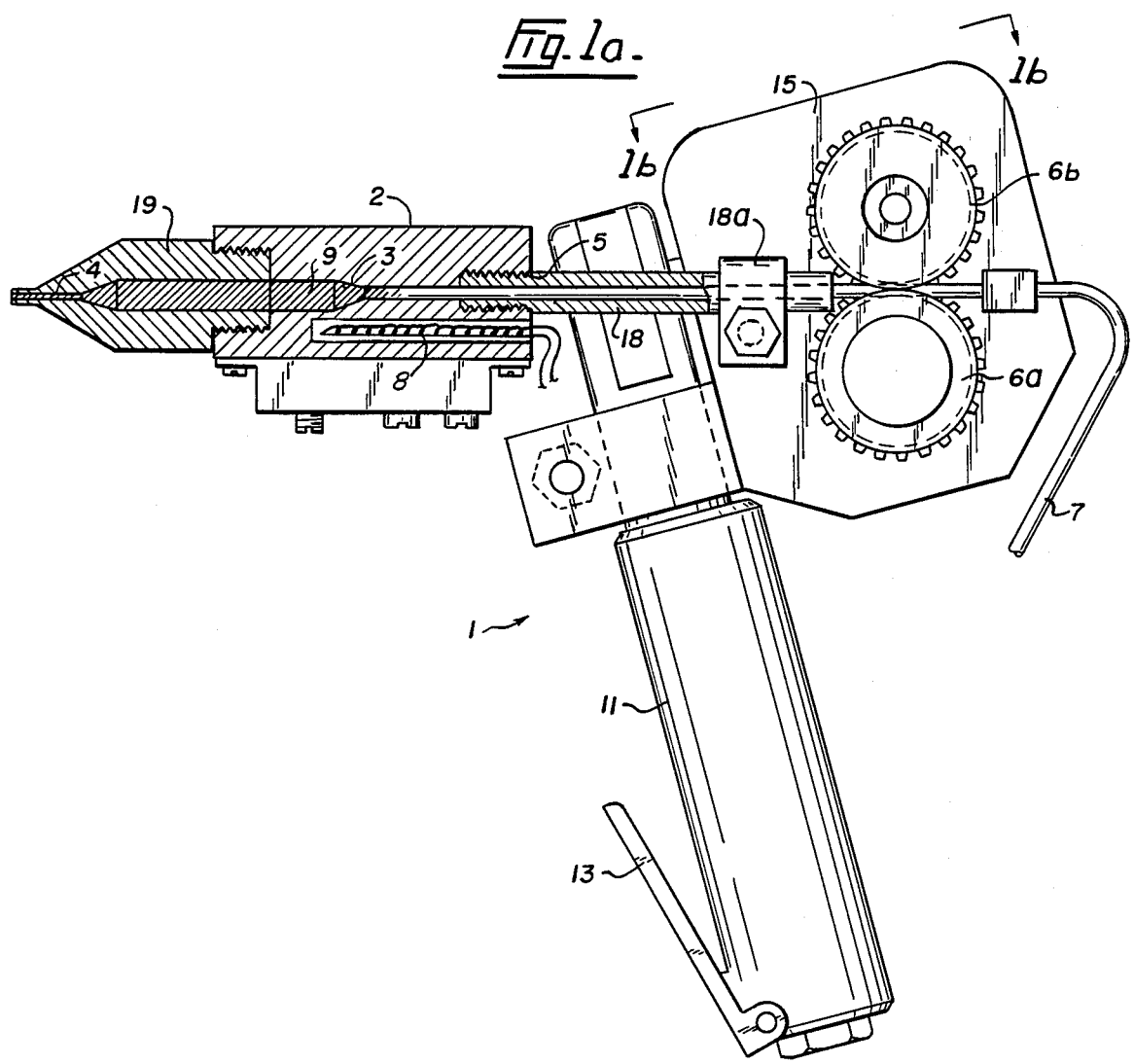
FIGS. 1a and 1b are side, partly sectional, views of one side of the gun.
Figure 1B:
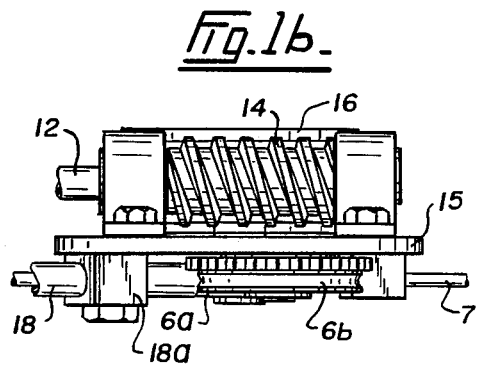
Figure 3A:
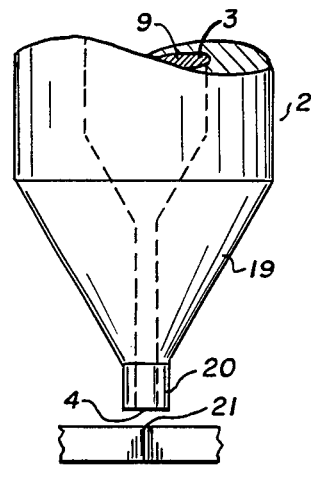
FIG. 3(a) is an end view showing the nozzle in close proximity to a junction line to be welded.
Figure 3B:
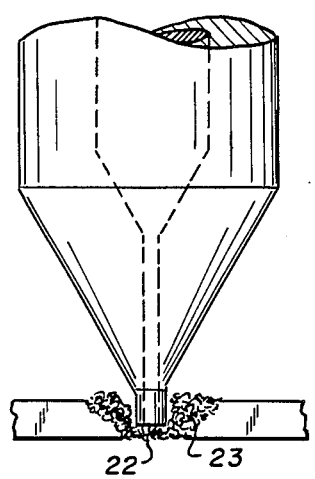
FIG. 3(b) is a fanciful representation of an end view showing the nozzle tip having penetrated the workpiece, having rendered workpiece plastic in the weld area molten, and in the process of being drawn through the workpiece to plough the furrow and inject filler plastic.
Figure 3C:
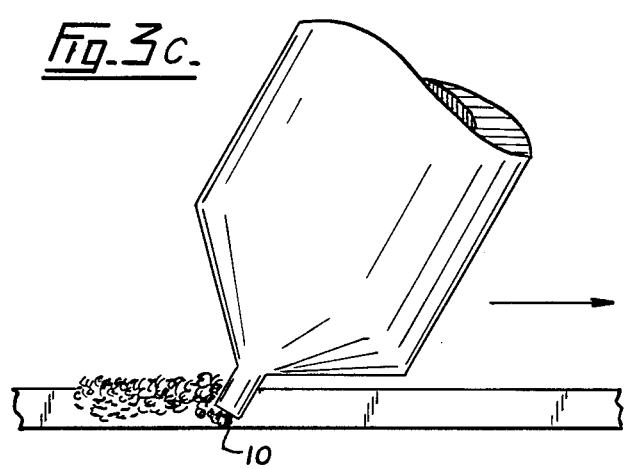
FIG. 3(c) is a side view similar to FIG. 3(b).

In broad outline, the gun 1 comprises a barrel 2 forming an internal chamber 3 having a restrictive orifice outlet 4 at one end and a filler rod inlet 5 at its other end. A pair of suitably driven drive rolls 6 feed the filler rod 7 into the chamber 3 through the inlet 5. A heater coil 8 heats the barrel 2 to plasticize the filler plastic 9 in the chamber 3. The molten plastic is ejected as a jet 10 from the chamber 3 through the orifice outlet 4.

In the preferred embodiment shown, drive rolls 6 are used to force the filler rod 7 into the chamber 3, to pressurize the molten plastic 9 at the orifice end of the chamber. This system was devised to provide a light unit that could easily be hand held. However, in another embodiment, applicant has used a hydraulically driven piston in a cylinder to feed increments of plastic into the barrel chamber and to pressurize the plastic in the chamber. This piston embodiment is not described in detail herein. However it is to be understood that the invention encompasses means other than drive rolls to feed the filler plastic into the chamber and to generate pressure therein.

As shown, the preferred embodiment comprises a conventional air driven ratchet wrench 11 having an output shaft 12. This wrench 11 is used to power the drive rolls 6. Actuation of the ratchet wrench 11 may be controlled by the switch 13.

The wrench output shaft 12 is connected with a worm 14, which is mounted on a plate or frame 15 secured to the wrench 11. The worm 14 meshes with a worm gear 16 which is connected by a shaft 17 with one grooved and geared feed roll 6a. The shaft 17 is mounted to the frame 15. The teeth of the shaft-driven feed roll 6a drive the teeth of the other grooved and geared feed roll 6b, so that they rotate together.

In operation, the feed rolls 6 can be rotated together by actuation of the wrench 11 to axially and forcefully feed the filler rod 7, which is tightly gripped between them, into the chamber 3.

The gun 1 further comprises a steel barrel 2 which forms an internal chamber 3.

A tube 18 extends into the inlet 5 of the barrel 2 and is secured thereto. The tube 18 functions as a guide, to direct the filler rod 7 into the chamber. The tube 18 is also secured to the frame 15 by a bracket 18a. Thus the tube 18 and barrel 2 are attached to the wrench 11 and frame 15—these components together form a solid unit.

A copper nozzle 19 is attached to the outlet end of the barrel 2. The nozzle 19 forms a restrictive orifice outlet 4 at its tip, which outlet 4 communicates with the chamber 3.

An electric heater coil 8 is mounted in the wall of the barrel 2. Actuation of the coil will heat the barrel 2, including its nozzle 19, and the plastic in the nozzle and the forward end of the chamber 3 to a high temperature.

In use, the drive system is operated to force filler rod 7 into the chamber 3 so as to generate a suitable pressure therein, typically in the order of 2500 psi. The heater coil 8 is operated to bring the nozzle 19, barrel 2 and plastic 9 in the chamber 3 to a suitable temperature, typically about 500° F. The heated nozzle tip 20 is pressed into contact with the weld area of the workpiece and drawn along the crack or junction line 21. The heat from the tip 20 quickly plasticizes the weld area plastic. As the tip is moved along, with the orifice outlet 4 submerged in the workpiece plastic, forced intermixing of the injected filler plastic 22 and the heated workpiece plastic 23 takes place and a competent weld is generated.

The embodiments of the invention in which an exclusive property or privilege is claimed are defined as follows:

1. A process for welding a crack or junction line in a workpiece formed of thermoplastic material using a dispensing device comprising a barrel forming an internal chamber and having a nozzle forming a restrictive orifice outlet in its tip, said tip having a thickness greater than that of the crack or junction line, said device comprising means for forcing filler plastic into the chamber, and means for heating the barrel including its nozzle tip, comprising:
    (a) filling the chamber with filler plastic;
    (b) heating the chamber contents and nozzle sufficiently to render molten the plastic in the chamber and to render molten the workpiece plastic immediately adjacent the crack or junction line at the nozzle tip when the tip is applied thereto;
    (c) penetrating the hot nozzle tip into the workpiece at the crack or junction line to render molten said adjacent workpiece plastic and submerge the tip therein and simultaneously feeding additional filler plastic into the chamber at a rate sufficient to cause molten filler plastic to be injected at high pressure through the orifice outlet of the submerged tip into the molten workpiece plastic, to fuse therewith; and
    (d) drawing the tip along the crack or junction line while maintaining the steps and conditions of paragraph (c), to effect the weld.

2. The process as set forth in claim 1 wherein:
    the filler plastic is injected at a pressure of at least about 2500 psi and the barrel contents and nozzle tip are heated to at least about 500° F.

* * * * *